United States Patent
Baker et al.

(10) Patent No.: US 9,551,578 B1
(45) Date of Patent: Jan. 24, 2017

(54) SYSTEMS AND METHODS FOR A RING LASER GYROSCOPE WITH ELECTRICALLY ISOLATED DITHER MOTOR

(71) Applicant: Honeywell International Inc., Morristown, NJ (US)

(72) Inventors: Stephen Matthew Baker, Roseville, MN (US); Dean Eivind Johnson, Orono, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/844,947

(22) Filed: Sep. 3, 2015

(51) Int. Cl.
*G01C 19/66* (2006.01)

(52) U.S. Cl.
CPC ............................ *G01C 19/662* (2013.01)

(58) Field of Classification Search
CPC ............................... G01C 19/00; G01C 19/66
USPC ...................................................... 356/459
See application file for complete search history.

(56) References Cited

U.S. PATENT DOCUMENTS

| | | | |
|---|---|---|---|
| 4,158,821 A | 6/1979 | Bresman | |
| 4,309,107 A | 1/1982 | McNair et al. | |
| 4,993,039 A | 2/1991 | Esskuchen et al. | |
| 5,432,604 A * | 7/1995 | Canfield | G01C 19/661 356/459 |
| 6,243,507 B1 | 6/2001 | Goldstein et al. | |
| 6,714,580 B2 | 3/2004 | Ecklund et al. | |
| 7,058,111 B2 * | 6/2006 | Seiber | G01S 13/94 372/55 |
| 2004/0008351 A1 * | 1/2004 | Ecklund | G01C 19/661 356/459 |
| 2008/0043241 A1 * | 2/2008 | Thorland | G01C 19/661 356/459 |

* cited by examiner

*Primary Examiner* — Jonathan Hansen
(74) *Attorney, Agent, or Firm* — Fogg & Powers LLC

(57) ABSTRACT

Systems and methods for a ring laser gyroscope with electrically isolated dither motor are provided. In one embodiment, a ring laser gyroscope, the gyroscope comprises: a laser block comprising a discharge gas filled chamber ring, a cathode, an anode and at least one other electrode; a dither motor mechanically coupled to the laser block and to a sensor chassis, wherein the laser block is secured to the sensor chassis by the dither motor; and an electrical isolator positioned between the dither motor and the laser block, wherein the electrical isolator electrically isolates the dither motor from the sensor chassis.

19 Claims, 4 Drawing Sheets

SYSTEMS AND METHODS FOR A RING LASER GYROSCOPE WITH ELECTRICALLY ISOLATED DITHER MOTOR

BACKGROUND

Ring laser gyroscopes are known to exhibit a reduction of lifetime at elevated temperatures. Previously identified solutions to obtain longer gyro life at elevated temperature have involved changing the anode and cathode electrode biasing on the ring laser gyroscopes. One problem with these prior solutions is that the each require significant electronic changes to the circuits that control energization of the discharge gas, and add complexity to the ring laser gyroscopes control electronics that may be more costly, and impacts system users of ring laser gyroscopes that design separate, unique electronics to control the RLG in an inertial system.

For the reasons stated above and for other reasons stated below which will become apparent to those skilled in the art upon reading and understanding the specification, there is a need in the art for alternate systems and methods for providing ring laser gyroscopes with an electrically isolated dither motor.

SUMMARY

The Embodiments of the present invention provide methods and systems for providing ring laser gyroscopes with an electrically isolated dither motor and will be understood by reading and studying the following specification.

In one embodiment, a ring laser gyroscope, the gyroscope comprises: a laser block comprising a discharge gas filled chamber ring, a cathode, an anode and at least one other electrode; a dither motor mechanically coupled to the laser block and to a sensor chassis, wherein the laser block is secured to the sensor chassis by the dither motor; and an electrical isolator positioned between the dither motor and the laser block, wherein the electrical isolator electrically isolates the dither motor from the sensor chassis

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide system and methods for mitigating gas wear-out degradations in a ring laser gyroscope. More specifically, the embodiments presented herein bring the potential of the dither motor away from the reference ground of the device (typically the voltage of the sensor chassis or housing). Fixing the potential of the dither motor to a non-reference ground potential alters the electric field in the glass material of the laser block, reducing ionic migration within the laser block of positive ions, such as lithium ions, that react with and absorbs elements of the discharge gas within the laser block. As discussed below, the dither motor is electrically isolated from the sensor housing, or chassis, and then a fixed voltage is applied to the body of the dither motor that holds the potential of the dither motor below that of the anode voltage. The anode voltage is driven by operation of the ring laser gyroscope to a potential that is more positive than the voltage of the cathode. In one embodiment, the potential of the dither motor is fixed to a potential between the anode voltage and the cathode voltage, but closer to the cathode voltage than the anode voltage. In other embodiments, the dither motor is fixed to a potential that is equal to, or more negative than, the cathode voltage. For example, in one implementation, the cathode voltage is set to −100 VDC while the anode voltage floats during operation of the laser block at approximately 100 VDC, and the dither motor is fixed to a potential of approximately −50 VDC. The electric field produce in the laser block due to the differences in potential between the dither motor and the cathode is less in magnitude than where the dither motor is electrically coupled to the sensor housing potential, resulting in a corresponding reduction in ion diffusion and mobility that translates into a longer effective life of the discharge gas. This is accomplished without having to re-engineer the circuitry that controls the voltage to the anodes and cathodes of the laser block to achieve the same affect while still properly energizing the discharge gas and operating the laser block.

Figure 1:
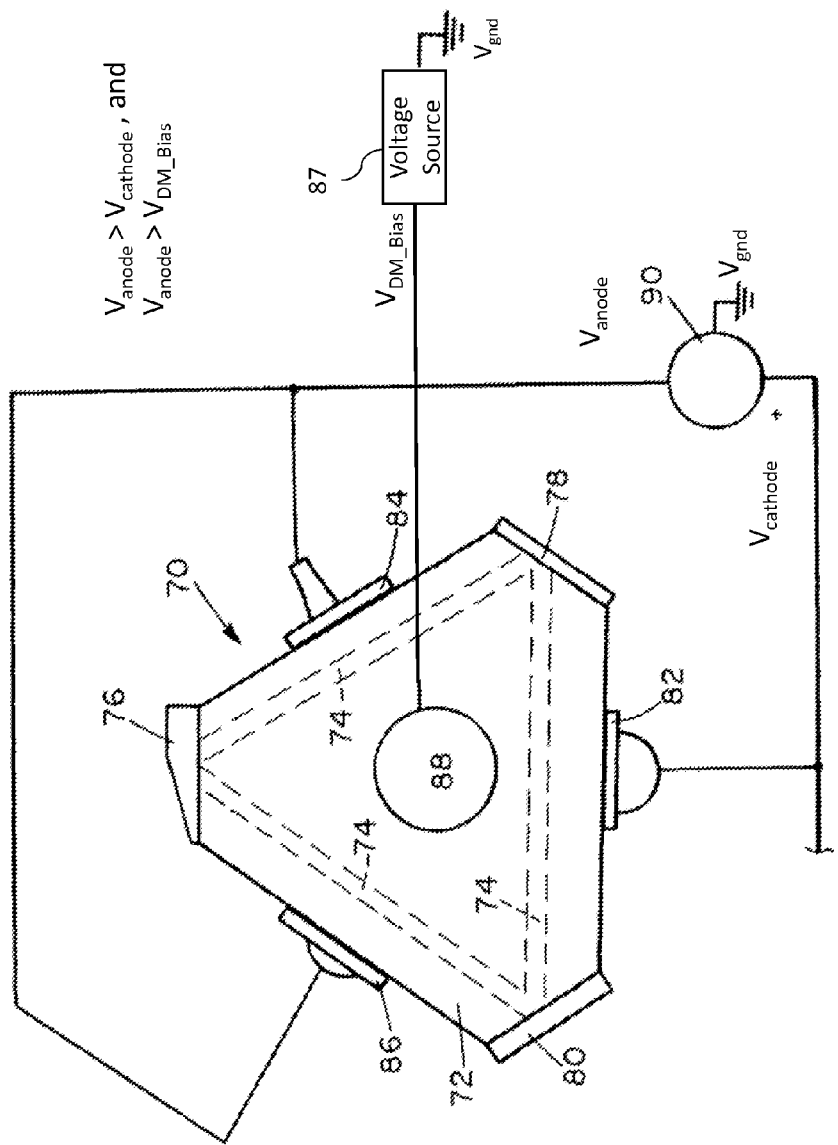
FIGS. 1 and 1A are each diagrams of ring laser gyroscopes of one embodiment of the present disclosure.
Figure 1A:
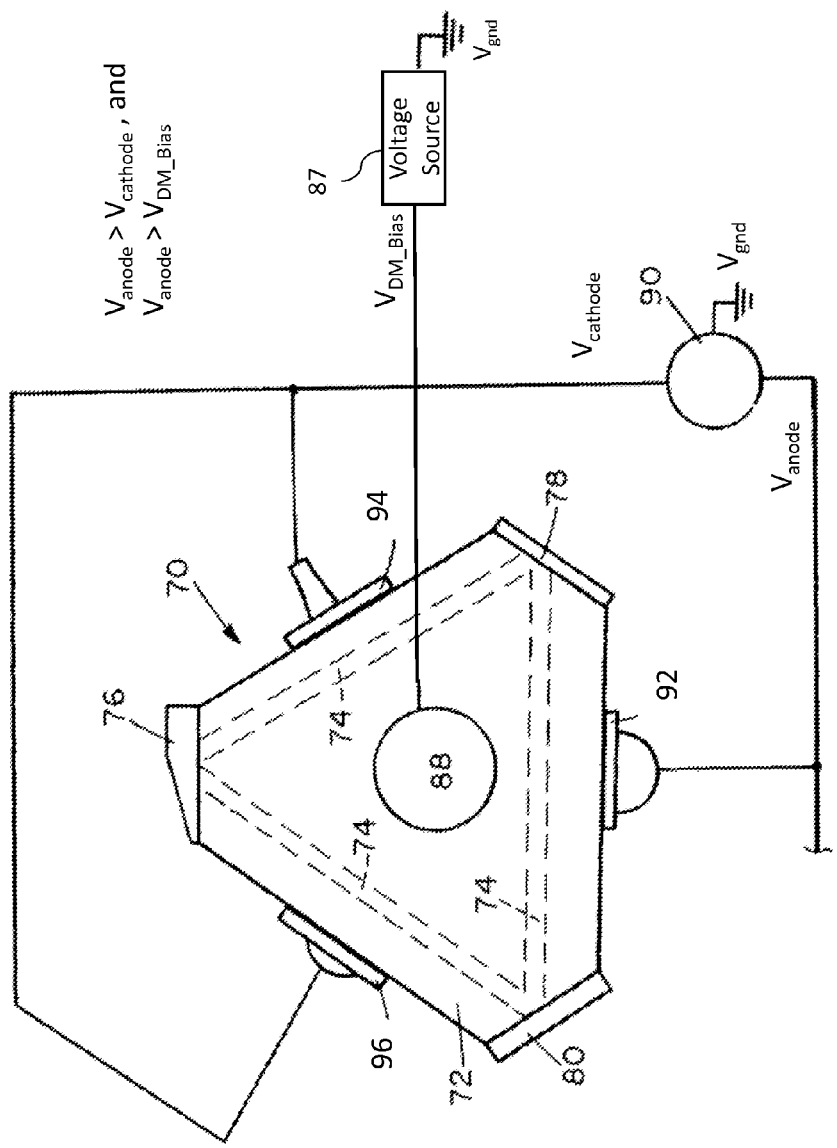
Figure 2:
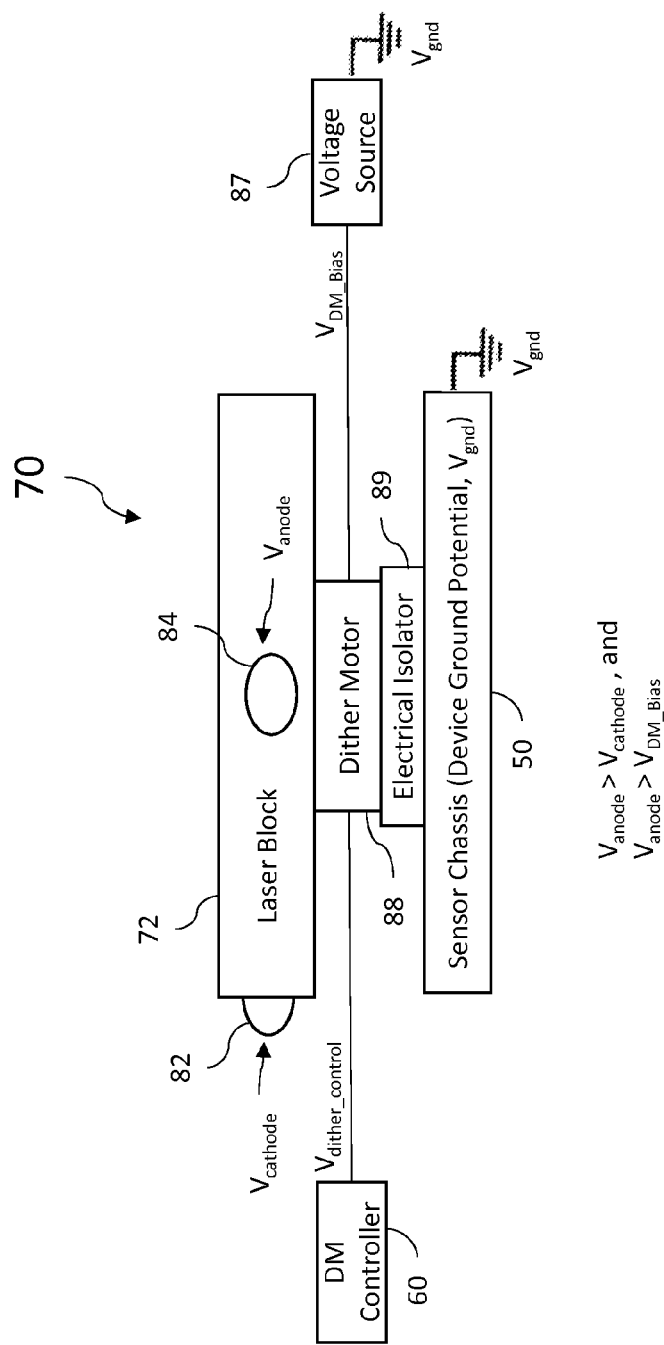
FIG. 2 is a diagram of a ring laser gyroscope of one embodiment of the present disclosure.

FIGS. 1, 1A and 2 are a block diagrams illustrating a ring laser gyroscope 70 of one embodiment of the present disclosure. Ring laser gyroscope 70 includes a laser block 72 in which in which interior gas filled chamber ring 74 is formed. Mirrors 76, 78 and 80 are provided at the corners with one of the mirrors 76, 78, and 80 being used as a read-out device. The interior gas filled chamber ring 74 and the mirrors 76, 78, and 80 define a plasma chamber in the form of a closed laser resonant path. As illustrated by FIGS. 1 and 1A, in different implementations, laser gyroscope 70 may have different specific configurations regarding the number of anodes and cathodes. In some implementations, laser gyroscope 70 can comprise one cathode and two anodes. In other implementations, laser gyroscope 70 can comprise one anode and two cathodes. It should be appreciated that any configuration of a laser block 72 having at least one anode and at least one cathode, and at least one additional electrode (which may be include one or more additional anodes or cathodes) may be utilized to practice embodiments of the present disclosure. For example, one alternate implementation may include a laser block having two anodes and two cathodes.

FIG. 1, provides one example implementation of a laser gyroscope having one cathode 82 and two anodes (shown at 84, 86) coupled to laser block 72 and through openings there through energize a discharge gas within chamber ring 74 to generate a laser plasma within ring 74. The ring laser gyroscope 70 further comprises a dither motor 88, and a power supply circuit 90 that supplies an electric potential across the cathode 82 and the anodes 84 and 86. In some embodiments, power supply circuit 90 can be implemented as a current supply circuit. In some embodiments, dither motor 88 comprises a piezoelectric dither motor. Laser block 72 is mounted to a chassis 50 of ring laser gyroscope 70 (which may also be referred to as the case or housing of ring laser gyroscope 70) via the dither motor 88. Dither motor 88, when energized and driven by dither motor controller 60, performs a dithering of the rotation sensing axis of laser block 72 as would be understood and known to one of ordinary skill in the art who has studied this disclosure. The electrical potential at chassis 50 defines the ground potential or reference voltage, $V_{gnd}$, of ring laser gyroscope 70. With embodiments of the present disclosure, the body of the dither motor 88 is electrically isolated from the chassis 50 and maintained at an electrical potential, $V_{DM\_Bias}$, that is not directly tied to the reference voltage $V_{gnd}$. As a result, the portion of the laser block 72 in contact with dither motor 88 is maintained at the voltage potential $V_{DM\_Bias}$ of dither motor 88. The voltage potential $V_{DM\_Bias}$ is applied to the body of dither motor 88 by a voltage source 87 which may be implemented using any convenient power supply or voltage source available within ring laser gyroscope 70.

As mentioned above, the power supply circuit 90 generates an electric potential across cathode 82 and the anodes 84 and 86 that energizes the discharge gas within ring 74 to generate a laser plasma. With embodiments of the present disclosure, power supply circuit 90 regulates the voltage at cathode 82 to set the cathode voltage at a fixed potential, $V_{cathode}$. Power supply circuit 90 permits the voltage at the pair of anodes 84, 86 to float at a potential $V_{anode}$ that is not fixed but will instead drift within a range of potentials. In operation, $V_{cathode}$ and $V_{anode}$ both may be, but are not necessarily, maintained at potentials more negative than the reference voltage $V_{gnd}$. Further, voltage source 87 applies the voltage $V_{DM\_Bias}$ to the body of dither motor 88 at a potential that is more negative than $V_{anode}$. For example, in one embodiment $V_{cathode}$ is fixed to a voltage of –100 VDC below reference voltage $V_{gnd}$ while $V_{anode}$ may operate within some range (for example 100 to 1100 volts) above $V_{cathode}$. $V_{DM\_Bias}$ would then be held by source 87 at a voltage that is more negative than the range in which $V_{anode}$ may operate. In one embodiment, the $V_{DM\_Bias}$ is fixed to a potential between $V_{anode}$ and $V_{cathode}$, but closer to $V_{cathode}$ than $V_{anode}$. In other embodiments, the dither motor is fixed to a potential that is equal to, or more negative than, $V_{cathode}$. Voltage source 87 may be implemented as separate power supply unit within ring laser gyroscope 70 or integrated, for example, with the power supply circuit 90. In some embodiments, $V_{DM\_Bias}$ may be obtained by taping off other working voltage lines within ring laser gyroscope 70.

FIG. 1A provides another example implementation of a laser gyroscope, in this case having one anode 92 and two cathodes (shown at 94, 96) coupled to laser block 72 and through openings there through energize a discharge gas within chamber ring 74 to generate a laser plasma within ring 74. Otherwise, the embodiment of FIG. 1A is structured and operates as described above. The power supply circuit 90 generates an electric potential across cathode 94, 96 and the anode 92 that energizes the discharge gas within ring 74 to generate a laser plasma. With embodiments of the present disclosure, power supply circuit 90 regulates the voltage at cathodes 94, 96 to set the cathode's voltage at a fixed potential, $V_{cathode}$ while anodes 92 floats at a potential $V_{anode}$ that is not fixed but will instead drift within a range of potentials (for example 100 to 1100 volts) above $V_{cathode}$. Voltage source 87 applies the voltage $V_{DM\_Bias}$ to the body of dither motor 88 at a potential that is more negative than the range in which $V_{anode}$ may operate.

As discussed above, the desired electric field to increase device longevity is obtained when the dither motor 88 has at its point of interface with the laser block 72 a voltage potential lower than that of the anode voltage $V_{anode}$. In some implementations, laser block 72 is made of a glass ceramic material such as, but not limited to, Lithium Aluminum Silicate. Within the crystal material of laser block 72 (which may be commonly referred to simply as "glass"), mobile agents such as lithium ions, are present that are very mobile so that under influence of an electric field, and even more so at elevated temperatures where diffusion and mobility is higher, these agents move around the glass and result in deleterious effects that cause shorter discharge life. By setting the dither motor 88 to a voltage potential less than $V_{anode}$, embodiments of the present disclosure reduce the mobility of the lithium ion within the glass material of laser block 72 by reducing the electric field in the glass. Controlling this electric field by adjusting the potential of the dither motor provides for the desired reduction in diffusion/mobility of the mobile agents while avoiding any need to re-design the electronic controls power sources that energize the discharge within the laser block 72 or any associated rotation sensing circuitry.

As illustrated in FIG. 2, isolation between the dither motor 88 and chassis 50 may be implemented using an electrical isolator 89 positioned at the interface between dither motor 88 and chassis 50. Electrical isolator 89 may comprise an electrical isolation material such as, but not limited to, a ceramic, plastic, or nylon material, a coated metal component, or a film or other coating applied to the dither motor 88 or the chassis 50 where the two elements interface such as an anodized coating or a dielectric film. In some implementations, electrically insulating fasteners may also be utilized. The specific properties of the electrical isolation material, including thickness dimensions, are at least partially a function of the potential difference expected to appear across the electrical isolator 89 from the dither motor 88 to the chassis 50.

Figure 3:
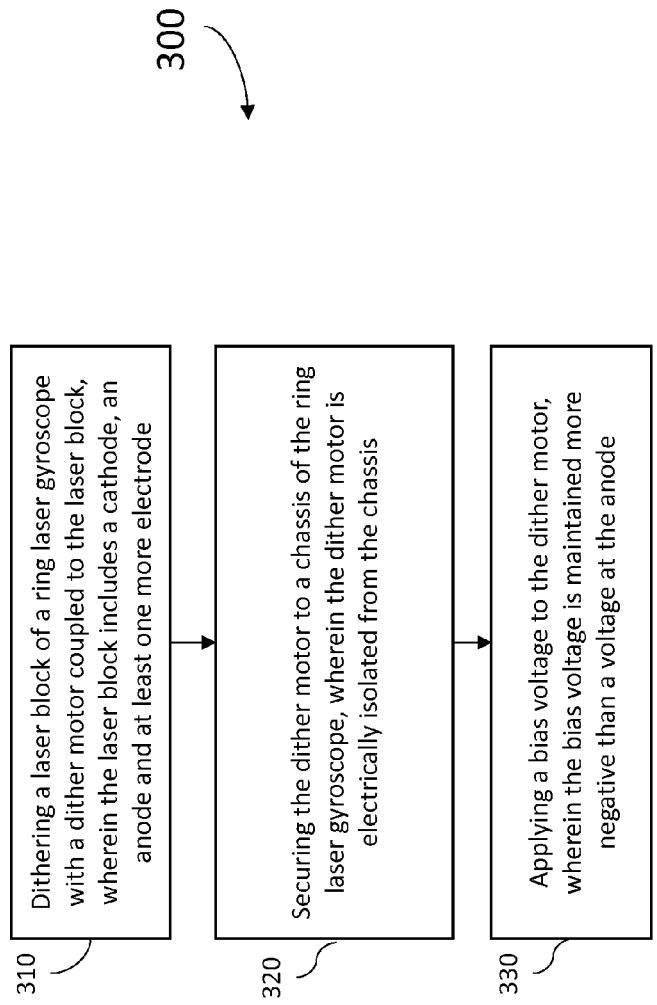
FIG. 3 is a flow chart illustration a method for a ring laser gyroscope of one embodiment of the present disclosure.

FIG. 3 is a flow chart illustrating a method 300 of one embodiment of the present disclosure. It should be appreciated that the elements of method 300 may be performed in conjunction with, in combination with, or substituted for elements of any of the preceding embodiments and implementations ring laser gyroscope 70 described above. Further, the description of elements for ring laser gyroscope 70 described above apply to like named elements of method 300 and vise verse.

The method begins at 310 with dithering a laser block of a ring laser gyroscope with a dither motor coupled to the laser block, wherein the laser block includes a cathode an anode and at least one more electrode. In alternate embodiments, at least one more electrode may comprise a second cathode or a second anode. In some embodiments, the dither motor may be implemented using a piezoelectric motor. The laser block may comprise Lithium Aluminum Silicate or other glass ceramic material and includes a discharge gas filled chamber ring that defines a plasma chamber in the form of a closed laser resonant path. The discharge gas is energized by the cathode and anodes to generate a laser plasma within the ring.

The method proceeds to 320 with securing the dither motor to a chassis of the ring laser gyroscope, wherein the dither motor is electrically isolated from the chassis. In one embodiment, a current supply circuit, or other power circuit, regulates the voltage at the cathode to set the cathode voltage at a fixed potential, $V_{cathode}$ that is more negative than reference voltage $V_{gnd}$. In other embodiments, the cathode voltage may be at a fixed potential, $V_{cathode}$ that is more positive than reference voltage $V_{gnd}$. The current supply circuit permits the voltage at the anode to float at a potential $V_{anode}$ that is not fixed but will instead drift within a range of potentials. In one embodiment in operation, $V_{cathode}$ and $V_{anode}$ may both be maintained at potentials more negative than the reference voltage $V_{gnd}$. In another embodiment in operation, $V_{cathode}$ may be maintained at potentials more negative than the reference voltage $V_{gnd}$ while $V_{anode}$ may float above $V_{gnd}$. In still another embodiment in operation, $V_{cathode}$ and $V_{anode}$ may both be maintained at potentials more positive than the reference voltage $V_{gnd}$.

The method proceeds to 330 with applying a bias voltage $V_{DM\_Bias}$ to the dither motor, wherein the bias voltage $V_{DM\_Bias}$ is maintained more negative than a voltage at the anode. In one embodiment, a voltage source applies the voltage $V_{DM\_Bias}$ to the body of the dither motor at a potential that is more negative than $V_{anode}$. For example, in one embodiment $V_{cathode}$ is fixed to a voltage of −100 VDC below reference voltage $V_{gnd}$ while $V_{anode}$ may operate within a range above $V_{cathode}$. $V_{DM\_Bias}$ would then be held at a voltage that is more negative than the range in which $V_{anode}$ may operate. In one embodiment, the $V_{DM\_Bias}$ is fixed to a potential between $V_{anode}$ and $V_{cathode}$, but closer to $V_{cathode}$ than $V_{anode}$. In other embodiments, the dither motor is fixed to a potential that is equal to, or more negative than, $V_{cathode}$.

EXAMPLE EMBODIMENTS

Example 1 includes a ring laser gyroscope, the gyroscope comprising: a laser block comprising a discharge gas filled chamber ring, a cathode, an anode and at least one other electrode; a dither motor mechanically coupled to the laser block and to a sensor chassis, wherein the laser block is secured to the sensor chassis by the dither motor; and an electrical isolator positioned between the dither motor and the laser block, wherein the electrical isolator electrically isolates the dither motor from the sensor chassis.

Example 2 includes the gyroscope of example 1, further comprising: a power supply circuit coupled to the cathode and the anode; and a voltage source coupled to a body of the dither motor; wherein the power supply circuit applies a cathode voltage, $V_{cathode}$ to the cathode and produces an anode voltage, $V_{anode}$, at the anode; wherein the voltage source maintains the body of the dither motor at an electrical potential, $V_{DM\_Bias}$, that is more negative than the anode voltage, $V_{anode}$.

Example 3 includes the gyroscope of example 2, wherein the current supply circuit and the voltage source each comprise part of an integrated power supply.

Example 4 includes the gyroscope of example 2, wherein $V_{cathode}$ and $V_{anode}$ are both maintained at potentials more negative than the reference voltage $V_{gnd}$.

Example 5 includes the gyroscope of example 2, wherein $V_{cathode}$ and $V_{anode}$ are both maintained at potentials more positive than the reference voltage $V_{gnd}$.

Example 6 includes the gyroscope of any of examples 2-5, wherein $V_{anode}$ operates within a first range above $V_{cathode}$; and wherein $V_{DM\_Bias}$ is held by the voltage source at a voltage that is more negative than the first range in which $V_{anode}$ operates.

Example 7 includes the gyroscope of any of examples 2-6, wherein $V_{anode}$ operates within a range of 100 to 1100 VDC above $V_{cathode}$.

Example 8 includes the gyroscope of any of examples 2-7, wherein $V_{DM\_Bias}$ is fixed to a potential that is equal to, or more negative than, $V_{cathode}$.

Example 9 includes the gyroscope of any of examples 2-8, wherein $V_{DM\_Bias}$ is fixed to a potential between $V_{anode}$ and $V_{cathode}$, but closer to $V_{cathode}$ than $V_{anode}$.

Example 10 includes the gyroscope of any of examples 1-9 further comprising a dither motor controller coupled to the dither motor, wherein the dither motor controller controls a dithering of a rotation sensing axis of the laser block.

Example 11 includes the gyroscope of any of examples 1-10, wherein the laser block is made of a glass ceramic material comprising Lithium Aluminum Silicate.

Example 12 includes the gyroscope of any of examples 1-11, wherein the electrical isolator comprises an electrical isolation material that includes at least one of: a ceramic material; a plastic material; a nylon material; a coated metal component; a dielectric film applied to the dither motor; a dielectric film applied to the sensor chassis; or an anodized coating.

Example 13 includes a method for a ring laser gyroscope, the method comprising: dithering a laser block of a ring laser gyroscope with a dither motor coupled to the laser block, wherein the laser block includes a cathode, an anode and at least one more electrode; securing the dither motor to a chassis of the ring laser gyroscope, wherein the dither motor is electrically isolated from the chassis; and applying a bias voltage, $V_{DM\_Bias}$, to the dither motor, wherein the bias voltage $V_{DM\_Bias}$ is maintained more negative than a voltage $V_{anode}$ at the anode.

Example 14 includes the method of example 13, wherein the dither motor is a piezoelectric dither motor.

Example 15 includes the method of any of examples 13-14, wherein the dither motor is electrically isolated from the chassis by an electrical isolator that comprises an electrical isolation material including at least one of: a ceramic material; a plastic material; a nylon material; a coated metal component; a dielectric film applied to the dither motor; a dielectric film applied to the sensor chassis; or an anodized coating.

Example 16 includes the method of any of examples 13-15, wherein the laser block is made of a glass ceramic material comprising Lithium Aluminum Silicate Example 17 includes the method of any of examples 13-16, further comprising: energizing the cathode to a set voltage of $V_{cathode}$; wherein $V_{anode}$ operates within a first range above $V_{cathode}$; and wherein $V_{DM\_Bias}$ is held by a voltage source at a voltage that is more negative than the first range in which $V_{anode}$ operates.

Example 18 includes the method of example 17, wherein $V_{DM\_Bias}$ is fixed to a potential that is equal to, or more negative than, $V_{cathode}$.

Example 19 includes the method of any of examples 17-18, wherein $V_{DM\_Bias}$ is fixed to a potential between $V_{anode}$ and $V_{cathode}$, but closer to $V_{cathode}$ than $V_{anode}$.

Example 20 includes the method of any of examples 13-19, wherein the laser block is made of a glass ceramic material comprising Lithium Aluminum Silicate.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A ring laser gyroscope, the gyroscope comprising:
    a laser block comprising a discharge gas filled chamber ring, a cathode, an anode and at least one other electrode;
    a dither motor mechanically coupled to the laser block and to a sensor chassis, wherein the laser block is secured to the sensor chassis by the dither motor;
    an electrical isolator positioned between the dither motor and the laser block, wherein the electrical isolator electrically isolates the dither motor from the sensor chassis;
    a power supply circuit coupled to the cathode and the anode; and
    a voltage source coupled to a body of the dither motor;
    wherein the power supply circuit applies a cathode voltage, $V_{cathode}$ to the cathode and produces an anode voltage, $V_{anode}$ at the anode; and
    wherein the voltage source maintains the body of the dither motor at an electrical potential, $V_{DM\_Bias}$, that is more negative than the anode voltage, $V_{anode}$.

2. The gyroscope of claim 1, wherein the current supply circuit and the voltage source each comprise part of an integrated power supply.

3. The gyroscope of claim 1, wherein $V_{cathode}$ and $V_{anode}$ are both maintained at potentials more negative than the reference voltage $V_{gnd}$.

4. The gyroscope of claim 1, wherein $V_{cathode}$ and $V_{anode}$ are both maintained at potentials more positive than the reference voltage $V_{gnd}$.

5. The gyroscope of claim 1, wherein $V_{anode}$ operates within a first range above $V_{cathode}$; and wherein $V_{DM\ Bias}$ is held by the voltage source at a voltage that is more negative than the first range in which $V_{anode}$ operates.

6. The gyroscope of claim 1, wherein $V_{anode}$ operates within a range of 100 to 1100 VDC above $V_{cathode}$.

7. The gyroscope of claim 1, wherein $V_{DM\ Bias}$ is fixed to a potential that is equal to, or more negative than, $V_{cathode}$.

8. The gyroscope of claim 1, wherein $V_{DM\ Bias}$ is fixed to a potential between $V_{anode}$ and $V_{cathode}$, but closer to $V_{cathode}$ than $V_{anode}$.

9. The gyroscope of claim 1 further comprising a dither motor controller coupled to the dither motor, wherein the dither motor controller controls a dithering of a rotation sensing axis of the laser block.

10. The gyroscope of claim 1, wherein the laser block is made of a glass ceramic material comprising Lithium Aluminum Silicate.

11. The gyroscope of claim 1, wherein the electrical isolator comprises an electrical isolation material that includes at least one of:
    a ceramic material;
    a plastic material;
    a nylon material;
    a coated metal component;
    a dielectric film applied to the dither motor;
    a dielectric film applied to the sensor chassis; or
    an anodized coating.

12. A method for a ring laser gyroscope, the method comprising:
    dithering a laser block of a ring laser gyroscope with a dither motor coupled to the laser block, wherein the laser block includes a cathode, an anode and at least one more electrode;
    securing the dither motor to a chassis of the ring laser gyroscope, wherein the dither motor is electrically isolated from the chassis; and
    applying a bias voltage, $V_{DM\_Bias}$, to the dither motor, wherein the bias voltage $V_{DM\_Bias}$ is maintained more negative than a voltage $V_{anode}$ at the anode.

13. The method of claim 12, wherein the dither motor is a piezoelectric dither motor.

14. The method of claim 12, wherein the dither motor is electrically isolated from the chassis by an electrical isolator that comprises an electrical isolation material including at least one of: a ceramic material; a plastic material a nylon material; a coated metal component; a dielectric film applied to the dither motor; a dielectric film applied to the sensor chassis; or an anodized coating.

15. The method of claim 12, wherein the laser block is made of a glass ceramic material comprising Lithium Aluminum Silicate.

16. The method of claim 12, further comprising: energizing the cathode to a set voltage of $V_{cathode}$; wherein $V_{anode}$ operates within a first range above $V_{cathode}$; and wherein $V_{DM\ Bias}$ is held by a voltage source at a voltage that is more negative than the first range in which $V_{anode}$ operates.

17. The method of claim 16, wherein $V_{DM\_Bias}$ is fixed to a potential that is equal to, or more negative than, $V_{cathode}$.

18. The method of claim 16, wherein $V_{DM\_Bias}$ is fixed to a potential between $V_{anode}$ and $V_{cathode}$, but closer to $V_{cathode}$ than $V_{anode}$.

19. The method of claim 12, wherein the laser block is made of a glass ceramic material comprising Lithium Aluminum Silicate.

* * * * *